United States Patent Office 2,768,984
Patented Oct. 30, 1956

2,768,984

COLOR IMPROVEMENT IN PREPARATION OF DRYING OILS

Joseph K. Mertzweiller, Baton Rouge, and Joseph L. Betts, Jr., East Baton Rouge, La., assignors to Esso Research and Engineering Company, a corporation of Delaware No Drawing. Application May 12, 1953,
Serial No. 354,636

2 Claims. (Cl. 260—669)

This invention relates to an improvement in color of certain siccative diolefin polymers. In particular, the invention is concerned with a heat treatment of drying oils prepared by copolymerization of 75 to 85% butadiene and 25 to 15% styrene.

The preparation of synthetic drying oils by polymerizing butadiene-1,3, or especially by copolymerizing 75 to 85% butadiene-1,3, and 25 to 15% styrene with the aid of metallic sodium and in the presence of an inert hydrocarbon diluent, and preferably also in the presence of an other diluent such as dioxane-1,4, is described and claimed in copending application Serial No. 329,195 filed December 31, 1952, by Anthony H. Gleason. In the manner described a suitable polymeric drying oil can be produced which, when dissolved in an equal quantity of a hydrocarbon solvent such as mineral spirits, generally has a viscosity between about 0.15 and 20 poises, or about 1,500 and 20,000 poises when diluent-free, corresponding to an intrinsic viscosity range of about 0.03 to 0.45. However, the resulting oils have been found to contain color bodies due to the presence of impurities in the starting materials. This is particularly undesirable if the oil is to be used in formulation of white enamels or paints.

Ordinarily the synthesis is carried out until complete conversion of the monomers is achieved, at which time the catalyst is quenched, e. g. by the addition of acetic acid. It has now been found that considerable color improvement can be realized by heat soaking the synthesis mixture, at temperatures at or somewhat above reaction temperatures, e. g. 50–120° C. after complete conversion and before removal of the catalyst.

The drying oils to which the present invention is primarily applicable are those prepared by copolymerizing 75 to 85 parts of butadiene-1,3 and 25 to 15 parts of styrene. The polymerization is carried out in a reaction diluent at temperatures ranging from about 25 to 95° C., or preferably between 40 and 85° C., and is desirably continued until complete conversion of monomers is obtained. About 1.2 to 8 parts, preferably 1.2 to 3 parts when a batch process is employed and 2 to 5 parts when a continuous process is used, of finely divided metallic sodium per 100 parts of monomers are used as catalyst. Materials used as diluents in the polymerization are inert hydrocarbons which remain liquid under the reaction conditions employed. Accordingly, the diluents employed having a boiling point between about 20 and 250° C., the low boiling diluents being useful where it is permissible to keep the reaction pressure sufficiently high to maintain the diluent in liquid condition at the reaction temperature used.

Preferred diluents are essentially aliphatic hydrocarbons such as naphtha having a boiling range between about 90 and 120° C., or straight run mineral spirits such as "Varsol" having a boiling range between about 150 and 200° C. Butane, benzene, cyclohexane and similar inert hydrocarbons are also useful, individually or in admixture with each other. The hydrocarbon diluents are used in amounts ranging from 100 to 500, and preferably 200 to 300 parts per 100 parts of monomers. In other words, the resulting drying oil composition as synthesized normally contains about 20 to 50% of the siccative polymer dissolved in a hydrocarbon solvent. When desired, more concentrated drying oil compositions can be produced from the synthesis product by stripping off excess solvent.

In order to assure the formation of a product of proper clarity, viscosity and drying rate, it is also desirable to employ in the polymerization about 1 to 100 parts, preferably 5 to 50 parts of an ether promoter per 100 parts of monomers. Cyclic diethers of 4 to 8 carbon atoms having an —O—C—C—O group, such as dioxane-1,4, and its methyl and ethyl homologues, have been found as particularly effective promoters. Other suitable ether promoters are aliphatic mono- or di-ethers of 4 to 8 carbon atoms such as diethyl ether, diethyl ether of ethylene glycol, and diethyl ether of diethylene glycol. Finally, it is also beneficial to use about 1 to 50% weight percent, preferably 1 to 30 weight percent (based on sodium) of an alcohol such as methanol, isopropanol or n-amyl alcohol in the polymerization recipe.

The present invention is based on the discovery that when drying oils of the nature described above are heated at temperatures of about 50 to 120° C., in the presence of the catalyst, the color of the treated oil is rapidly improved. In accordance with the present invention the color of a synthetic oil can thus be improved without necessarily affecting the viscosity of the oil to a pronounced degree, though the viscosity of the oil can also be increased simultaneously to any desired end value, if the heat treating is extended for more prolonged periods. For instance, an unexpected improvement in color can be obtained in less than 1.5 hours at 60° C., without raising the product viscosity.

Example I

In a typical large pilot plant, batch synthesis operations were carried out with the following recipe:

| Component: | Parts by weight |
|---|---|
| Butadiene | 80 |
| Styrene | 20 |
| Hydrocarbon diluent | 235–275 |
| Dioxane | 30 |
| Sodium catalyst | 1.5–1.9 |
| Isopropanol (activator) | 0.3 |

In synthesis operations at temperatures of 50–60° C., the catalyst was quenched by the addition of an excess over the stoichiometric of glacial acetic acid at or before complete monomer conversions were attained. Typical color values (Hazen scale) measured at polymer concentrations of 50% wt. percent in Varsol were as follows:

| Run No. | Run Hour | Conversion, Percent | Pressure, p. s. i. g. at termination | Hazen Color (50% Solids) |
|---|---|---|---|---|
| 1 | | 94 | | 450 |
| 2 | | 62 | 19 | 350 |
| 3 | | 100 | 10 | 250 |
| 4 | | 100 | 7 | 320 |
| 5 | | 94 | 12 | 390 |
| 6 | | 100 | 8 | 290 |
| 7 | | ¹100 | 8 | 180 |
| 8 | | ²100 | | 270 |
| 9 | 3 | 61 | | 410 |
|  | 4.5 | 85 | | |
|  | 6 | 100 | | 270 |
|  | 7.5 | 100 | | 210 |
| 10 | 4.5 | 68 | | 320 |
|  | 6 | 82 | | |
|  | 7.5 | 96 | | 270 |
|  | 9 | 100 | | 270 |
|  | 10.5 | 100 | | 200 |
| 11 | 3 | 80 | | 300 |
|  | 4.5 | 100 | | |
|  | 6 | 100 | | 240 |
|  | 7.5 | 100 | | 200 |

¹ Product heat soaked at 50° C. for 1½ hours prior to quenching catalyst.
² Same as run No. 7 except sample was withdrawn at complete conversion but prior to heat soaking.

The foregoing data clearly show the improvement effected by heat soaking the oil prior to removing the catalyst, the color being reduced from 40 to 90 points by the heating.

*Example II*

Similar color improvements are apparent from smaller scale operations carried out in steel bottles and employing approximately the same synthesis recipe as Example I. In these operations conversion samples are not withdrawn but pressure provides an approximate index of conversion, a pressure of zero being indicative of about complete conversion. All data are for operation at 55° C.

| Run No. | 9 | 10 | 11 | 12 | 13 |
|---|---|---|---|---|---|
| Catalyst, percent Na | 1.5 | 1.7 | 1.7 | 1.7 | 1.7 |
| Press. at Termination, in. Hg | 0 | −10 | −4 | −8 | −8 |
| Hazen Color @ 50% Solids | 180 | 160 | 160 | 130 | 130 |

In the above tests in which some heat soaking was achieved (4–10 inches Hg vacuum) colors were in the range of 130–160 Hazen. This compares with 180 for the large scale operation of Example I involving the soaking technique and 250–320 when no heat soaking was used.

The nature of the present invention having been thus fully set forth and specific examples of the same given, what is claimed as new and useful and desired to be secured by Letters Patent is:

1. A process for preparing a substantially colorless synthetic drying oil which comprises heating to 25 to 90° C. a mixture of 75 to 85 parts of butadiene, 25 to 15 parts of styrene, 200 to 300 parts of hydrocarbon diluent and 20 to 30 parts of an ether selected from the group consisting of aliphatic ethers of 4 to 8 carbon atoms and cyclic diethers of 4 to 8 carbon atoms in the presence of finely divided sodium at a temperature between 40 and 85° C. until substantially complete conversion is obtained, then continuing the heating in the presence of the unused sodium at 50 to 120° C., for ½ to 1.5 hours.

2. A process for preparing a substantially colorless synthetic drying oil which comprises heating at from 25–90° C. a mixture of 75 to 85 parts of butadiene and 25 to 15 parts of styrene in a hydrocarbon solvent having a boiling range between about 20 and 250° C. and in the presence of finely divided sodium at a temperature between 25 and 95° C. until substantially complete conversion is obtained, then continuing the heating in the presence of the unused sodium at 50 to 120° C. for ½ to 1½ hours.

References Cited in the file of this patent

UNITED STATES PATENTS

| | | |
|---|---|---|
| 2,264,811 | Rothrock | Dec. 2, 1941 |
| 2,527,768 | Schulze et al. | Oct. 31, 1950 |
| 2,586,594 | Arundale et al. | Feb. 19, 1952 |
| 2,631,175 | Crouch | Mar. 10, 1953 |
| 2,669,526 | Koenecke et al. | Feb. 16, 1954 |
| 2,672,425 | Gleason et al. | Mar. 16, 1954 |

FOREIGN PATENTS

| | | |
|---|---|---|
| 334,184 | Great Britain | Aug. 25, 1930 |
| 545,193 | Great Britain | May 14, 1942 |